United States Patent
Gard et al.

(10) Patent No.: US 6,415,279 B1
(45) Date of Patent: Jul. 2, 2002

(54) METHOD AND ACCESS MEANS FOR DETERMINING THE STORAGE ADDRESS OF A DATA VALUE IN A MEMORY DEVICE

(75) Inventors: Bengt Erik Ingemar Gard, Tullinge; Sten Edvard Johnsson, Farsta; Lars-Örjan Kling, Södertälje, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/265,952

(22) Filed: Mar. 11, 1999

(30) Foreign Application Priority Data

Mar. 12, 1998 (DE) .......................... 198 10 843

(51) Int. Cl.⁷ ............................. G06F 17/30
(52) U.S. Cl. ........................... 707/2; 704/222
(58) Field of Search ................ 707/2, 3, 7; 365/49; 704/222; 716/3, 20; 708/7, 503, 709

(56) References Cited

U.S. PATENT DOCUMENTS

| | | |
|---|---|---|
| 4,751,684 A | 6/1988 | Holt |
| 5,155,837 A | 10/1992 | Liu et al. |
| 5,204,967 A | 4/1993 | Armstrong |
| 5,410,703 A | 4/1995 | Nilsson et al. |
| 5,418,947 A | 5/1995 | Hsu et al. |
| 5,442,783 A | 8/1995 | Oswald et al. |
| 5,459,606 A | 10/1995 | Baranyai et al. |
| 5,481,721 A | 1/1996 | Serlet et al. |
| 5,495,610 A | 2/1996 | Shing et al. |
| 5,555,418 A | 9/1996 | Nilsson et al. |
| 5,649,112 A | 7/1997 | Yeager et al. |
| 5,734,791 A * | 3/1998 | Acero et al. ............ 704/200 |

FOREIGN PATENT DOCUMENTS

| | | |
|---|---|---|
| DE | 2 013 500 | 10/1970 |
| DE | 41 34 207 | 4/1993 |
| DE | 43 16 500 | 3/1995 |
| DE | 44 29 969 | 2/1996 |

(List continued on next page.)

OTHER PUBLICATIONS

Aho, Alfred V. et al., "Advanced Set Representation Methods", Data Structures and Algorithms, Chapter 5, pp. 155–197, 1983.

Aho, Alfred V. et al., "Sorting", Data Structures and Algorithms, Chapter 8, pp. 253–292, 1983.

Keutel, Ulf et al., "Remote upgrading and updating of AXE 10 software", Ericsson Review, No. 2, 10 pgs., 1996.

Om Vikas and V. Rajaraman, "Searching in a Dynamic Memory with Fast Sequential Access", Jul. 1982, vol. 25, pp. 479–484.

D.W. Cooper, "Implicit Table Look–Up Access Method", Jan. 1972, vol. 14, No. 8, pp. 2493–2495.

Primary Examiner—Diane D. Mizrahi
Assistant Examiner—Apu M Mofiz
(74) Attorney, Agent, or Firm—Burns, Doane, Swecker & Mathis, L.L.P.

(57) ABSTRACT

A method and an access mechanism for determining the storage address of a predetermined data value ($D_1$, $D_2$, $D_3$) in a memory device is disclosed. The data values are stored in an increasing order sequentially in a column direction according to a binary tree data structure. A new subtree root node ($B(L(X))$, $B(R(X))$, $A=1$ is calculated from the previous leaf node address (LN) when the data value to be searched is not located in the previous subtree. Since a new subtree root node ($X_1$) is always calculated from a previous leaf node address and the comparison result between the searched and read out value, the number of row address changes can be kept to a minimum whilst a high speed for the subtree searching is maintained. The search method and the access means is memory efficient since no pointers are used and fast, since the address of a next memory location to be investigated can always be calculated from the previous address and the last comparison result.

31 Claims, 9 Drawing Sheets

FOREIGN PATENT DOCUMENTS

| | | |
|---|---|---|
| DE | 44 38 697 | 5/1996 |
| DE | 195 33 961 | 3/1997 |
| DE | P198784.6-53 | 3/1998 |
| DE | P19810802.8-53 | 3/1998 |
| DE | P19810807.9-53 | 3/1998 |
| DE | P19810814.1-53 | 3/1998 |
| WO | WO94/01819 | 1/1994 |
| WO | WO95/12846 | 5/1995 |
| WO | WO96/09580 | 3/1996 |
| WO | WO98/07094 | 2/1998 |

* cited by examiner

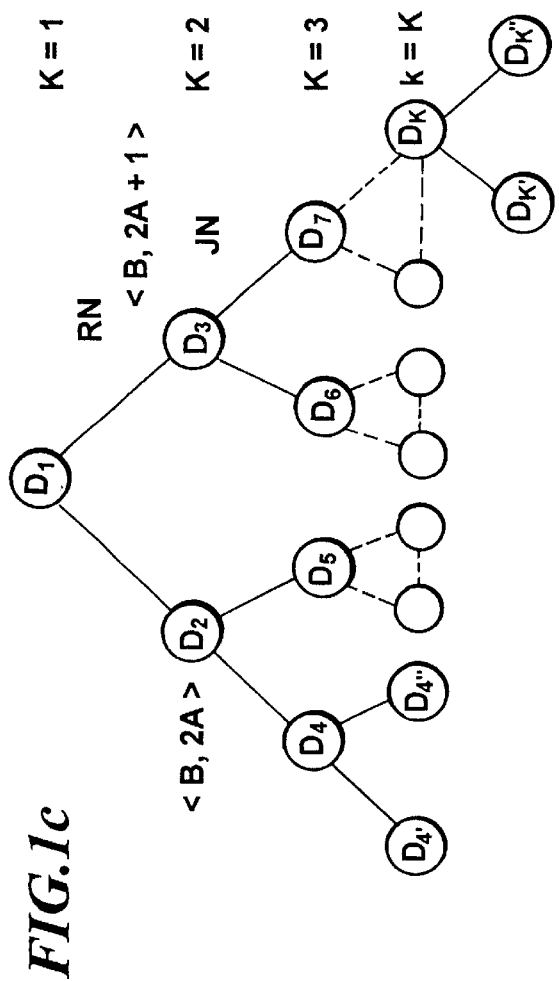
FIG.1c
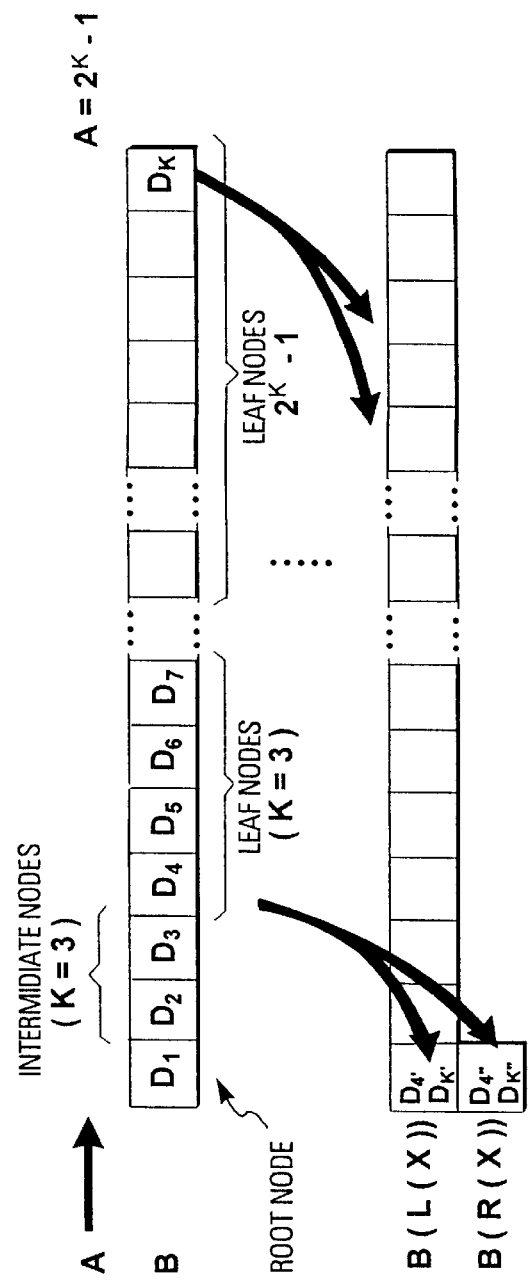

FIG.3a

COLUMN ADDRESS A →

ROW ADDRESS B ↓

| | 001 | 010 | 011 | 100 | 101 | 110 | 111 | |
|---|---|---|---|---|---|---|---|---|
| 000 | 56 | 27 | 82 | 13 | 45 | 71 | 93 | SUBTREE 1 |
| 001 | 19 | 17 | 23 | • | • | • | | SUBTREE 2 |
| 010 | 30 | 29 | 37 | • | • | • | | |
| 011 | 50 | 49 | 52 | • | • | • | | |
| 100 | 61 | 58 | 62 | • | • | • | | |
| 101 | 77 | 73 | 79 | • | • | • | | |
| 110 | 89 | 84 | 91 | • | • | • | | |
| 111 | 97 | 94 | 99 | • | • | • | | |

FIG.5
PRIOR ART

COLUMN A →

|  | 000 | 001 | 010 | 010 | 011 | 100 | 101 | 111 |
|---|---|---|---|---|---|---|---|---|
| 000 |  |  |  |  |  | 13 |  | 17 |
| 001 | 20 | 22 | ••• |  |  |  |  |  |
| 010 |  | $D_3$ |  |  | 3 |  |  |  |
| 011 |  | R |  | 5 |  | 6 |  |  |
| 100 |  | 7 |  | 10 | 11 |  |  |  |
| 101 |  |  |  | $D_2$ |  |  | 15 |  |
| 110 |  |  | $D_1$ | L |  |  | D |  |
| 111 |  |  |  |  |  |  |  |  |

ROW B ↓

$S = < B(X), A(X) >$

BINARY TREE DATA STRUCTURE
WITH CONVENTIONAL TREE

METHOD AND ACCESS MEANS FOR DETERMINING THE STORAGE ADDRESS OF A DATA VALUE IN A MEMORY DEVICE

FIELD OF THE INVENTION

The invention relates to a method for determining the storage address of a predetermined data value in a memory device, wherein said data values are stored at predetermined storage addresses according to a binary tree data structure of nodes, branches, subtrees and leaves. In particular, the memory device may be addressed with an address consisting of two parts, i.e. a column address part and a row address part, wherein the entries in the memory device are stored in a two dimensional matrix array.

BACKGROUND OF THE INVENTION

There is often the need of performing a fast search for a particular data value in a memory which contains a great number of entries. For example, assume a situation in which a person's personal identification number is stored in a memory device and has associated with it certain information about the person's age, profession or car registration. This identification number may consist of many digits, i.e. in the memory there may be stored a large number of values. A different example is a CD-ROM where telephone numbers are stored and each telephone number has associated with it specific information indicating the home address belonging to that telephone number.

In order to avoid that a second memory device must be used, in which the specific locations of the individual entries are stored, i.e. in which the storage addresses are stored, the memory device containing the plurality of data values is searched for a particular data value and when the data value has been found, the associated information is read out. Of course, the data values (the personal identification number or the telephone number) may be stored randomly in the memory device and in this case the complete memory will have to be searched column- and row-wise to locate the data value, since no information is available whatsoever as to where the data value of interest could possibly be located.

To avoid a searching through the memory device from entry to entry which can take an almost indefinite amount of time regarding the size of the memory device, the data values (not the information associated therewith) is stored in the memory device according to predetermined rules which can be used later to re-locate the data value during the search procedure.

FIG. 5 shows an example of a two-dimensional memory where the data entries are addressed by an address having a row address part A and a column address part B, i.e. the address $S=<A(X), B(X)>$. X may be regarded as the node in a binary tree where the specific row address and column address intersect. As is seen in FIG. 5, the individual data values D may be stored randomly in the memory device and the usual procedure is to use a binary tree data structure for representing the sorted data values.

As is shown in FIG. 6, in the binary tree data structure each node (the intersection point X where a data value can be entered and read from) is connected to two other nodes. The search through the binary tree (or the memory device having entries mapped thereto) is as follows. A data value D1 is read out from a node X (located at row address $A(X)$ and column address $B(X)$) and the data value D1 is compared with the data value D whose storage address is to be determined. If $D<D1$, then the left branch L of the tree is taken and if $D1<D$ the right branch R is taken. The data structure (or the data values in the memory device) is—logically—organized in a way, such that the node $X_2$ will have a data value $D_2<D_1$ and that the data value $D3>D1$. However, since the individual data values $D_1$, $D_2$, $D_3$ are intrinsically stored randomly in the memory device, it is necessary for the binary tree search that—after having read out $D_1$ at $A(X_1), B(X_1)$—information is provided as to the location or memory address of $D_2$ or $D_3$.

Therefore, conventionally one solution is that each data value $D_1$, $D_2$, $D_3$ has associated (stored) two pointers, i.e. two further memory positions including addresses indicating the location of the data value which is greater (R) or smaller (L) than the read out data value. Whilst logically there is used the binary tree structure, wherein each further sub-level the stored data value will be respectively greater and smaller than in the previous sub-level (subtree) in the memory device itself as shown in FIG. 5, there is only a logical mapping using the address pointers whilst in principle the data values are stored randomly in the memory device.

Using the data entries with different address pointers requires the pre-definition of the route node RN which is the first node from which a data value should be read out and compared with the data value to be searched for. Such a search algorithm is described in "Data Structures and Algorithm", Aho Hopcroft, Ullmann; ISDN0-201-00023-7, pages 155 ff. Obviously, there is a disadvantage that the memory space that is needed for storing a great variety of data values requires that with each and every data value two further pointer entries are stored indicating the branches L, R.

Whilst in FIG. 5 there is only an implicit representation of the logical binary tree in the memory device, another solution is that a mapping of the binary tree data structure to fixed addresses in the memory device, i.e. to the elements of the matrix array, is used. In this case the branching addresses are known beforehand through the mapping of the binary tree nodes to pre-defined locations in the memory device and therefore pointers are not necessary here and occupy no memory space. Since the pointers do not have to be evaluated, the search time may be higher, as is disclosed in "Data Structures and Algorithms"; Aho, Hoppcraft, Ullmann; ISDN-0-201-00023-7; pp. 271 ff. Using such an explicit mapping of the individual nodes $X_1$, $X_2$, $X_3$ to specific locations in the memory device, the address of the respective "child" nodes $X_2$, $X_3$ within one subtree (!) can be calculated. In fact, representing the left and right branch by the column address A, the left branch is calculated as $$A(L(X))=2A(X)+0$$

whilst the right branch R is calculated as $$A(R(X))=2A(X)+1.$$

However, using such a mapping means that after a short initial traverse of the tree the most significant partition of the address changes in every further step of the traverse. Therefore, the search time may still be considerable for large trees that have to be stored in dynamic random access memory means due to their sizes. For real applications faster methods are required that in particular avoid the changes of the most significant partition of the address as much as possible.

SUMMARY OF THE INVENTION

As was explained above, the conventional methods either use the storage intensive pointer scheme or use a calculation of the column address A for deciding on the address of the next node connected to a left branch or right branch in a subtree. This is time-consuming and requires that the most significant part of the address (the row address B) changes in every further step of the traversals to the binary tree).

Therefore, the object of the present invention is to provide a method and an access means for determining the storage address of a pre-determined data value in a memory device, which do not require the usage of pointers for determining storage locations during the binary tree search and which can determine the storage address faster than the above described method where one part of the storage address is calculated instead of using a pointer.

This object is solved by a method according to claim 1 or 25. Furthermore, this object is solved by an access means according to claim 13 or 28.

Essentially, according to the invention it was realized that there is no necessity to perform the frequent changes in the most significant partition of the address but that an algorithm can be provided where not only the column part of the address but also the row part of the address are determined on the basis of the comparison result and the current address. In the present invention, the column address part of the mapping corresponds to the mapping described in the prior art while the row part of the mapping and the important combination of the address from the two parts allows the decrease of the search time until a data value is located in the memory.

According to the invention, when a leaf in a subtree is reached during the search, a new root node of another subtree is determined. If in this subtree the data value is still not found, the search procedure goes to the next leaf tree in the previous subtree and determines a new root node of another subtree. The leaves of the previous subtree are thus sequentially used in order to determine a new subtree. Since a search always means a traverse of the tree from the top to the bottom the search will mainly result in traverses into subtrees. Just a minimum number of steps will result in a change of subtrees. As a result of the mapping, only the column address changes during a traverse inside a subtree. Hence, the number of steps that result in a change of row address is minimized, i.e. the changes in the row address are kept to a minimum. Therefore, the time for a search will be reduced considerably.

Further advantageous embodiments and improvements of the invention may be taken from the dependent claims. Hereinafter, the invention will be described with reference to its embodiments and with reference to the attached drawings.

BRIEF DESCRIPTION OF THE DRAWINGS

In the drawings:

FIG. 1b–c shows a memory device where each row is mapped onto a subtree of FIG. 1a;

FIG. 3a shows an example how a new root address of a new subtree is determined from addresses of leaf nodes situated in the first row;

FIG. 3b shows an example of two binary tree searches in the first and second row of the memory device shown in FIG. 3a;

FIG. 5 shows a memory device in which data values are stored randomly at specific address positions according to the prior art.

In the drawings the same or similar reference numerals designate the same or similar parts.

PRINCIPLE OF THE INVENTION

The method and the access means of the invention are based on a mapping of nodes in a binary tree to the addresses of a memory device, preferably a dynamic random access memory (DRAM). DRAMs normally offer a very dense storage, however, they are rather slow with respect to randomly distributed accesses. Using a specific addressing mode according to the invention, much lower access times can be achieved. For this, certain restrictions must be met by the addresses of a sequence of consecutive accesses. The mapping according to the invention ensures that the search of a tree always results in a sequence of accesses that meet those restrictions. The reachable performance increase (time decrease) is about a factor of 10.

The address bits of the DRAM, as was explained above, are commonly divided into two parts called the row-address B and the column address A (see FIG. 5). Normally, the row and column address are equal in size. Because of the internal implementation of the DRAM, the access time is significantly short if consecutive accesses can be done by just changing the column address whilst the row address is kept unchanged as much as possible. Hence, the novel method and access means according to the invention for mapping allows a tree searching algorithm that meets the criteria of keeping the row address unchanged as much as possible.

Node Mapping According to the Invention

Figure 1A:
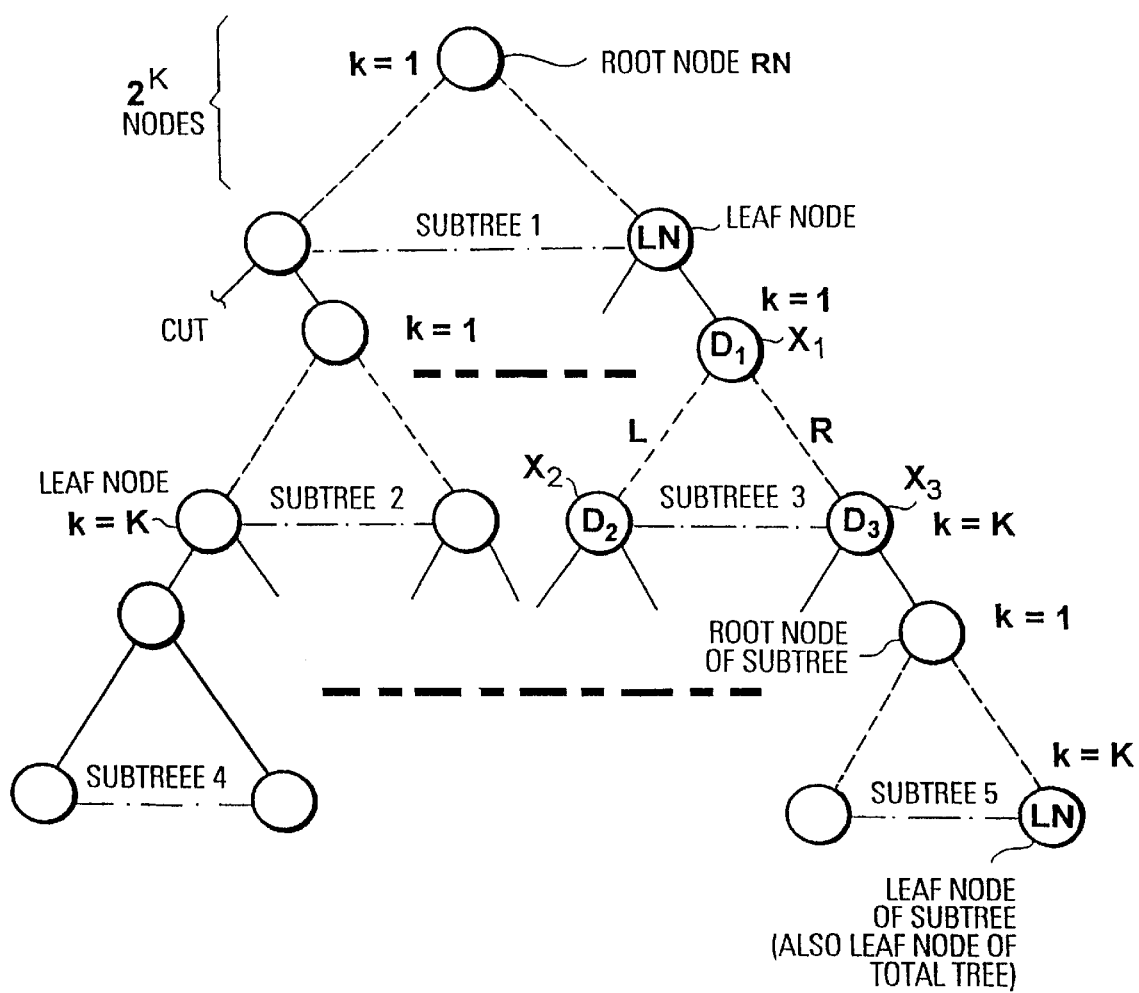
FIG. 1a shows a binary tree structure using subtrees according to the invention.

FIG. 1a shows the division of a binary tree into a number of subtrees according to the invention. The complete tree comprises a number of subtrees 1, 2, 3, 4, 5. In FIG. 1a each subtree has a root node which is designated with "k=1". Likewise, each leaf node of a subtree is designated with "k=K". K is the "depth" of the subtree, i.e. there are a number of other nodes which are only sketched by dashed lines within each subtree. So actually, each sketched subtree in FIG. 1a comprises K levels which corresponds to $2^K$ nodes in total per subtree.

Once a root node has been accessed via its column- and row-address, a search is respectively carried out in a subtree having a number of levels K. Each subtree has (lowest) leaf nodes which are connected to a respective root node of the next subtree. It may be noted that in FIG. 1a only the nodes are completely drawn which are either root nodes or leaf nodes of subtrees. For example, the leaf node LN of subtree 1 is connected directly to the root node $X_1$ of subtree 3. There are a number of intermediate nodes between the root node $X_1$ and its leaf nodes $X_2$, $X_3$. The root node is located at k=1 and the leaf node is located at k=K. the leaf node LN of subtree 5 simultaneously constitutes also a leaf node of the entire binary tree. Therefore, it is important to distinguish between routes and leaves of the total tree and route and leaves of the subtrees. In each subtree, the variable k steps from 1 to K for each traverse of a subtree, repeatedly until the value searched for is found or a leaf node of the total tree is reached.

The number of levels in a subtree depends on the actual memory hardware. According to the present invention the mapping to the memory locations is performed in such a way that one row contains $2^K-1$ entries, i.e. columns. As will be seen in the following, the search within each subtree according to the invention corresponds to a search within one individual row. The memory locations along the row (e.g. along the subtree 1) correspond to the root node, the subtree nodes and the leaf nodes LN of the specific subtree. Each read-out data value $D_1$, $D_2$, $D_3$ is compared with the data value D to be located and a decision is made as to whether the left or right branch within the subtree needs to be taken.

The organization of the data is as follows: the deeper the level k (k=1, 2, ..., K) of the node in a subtree becomes, the higher the data values are. This is equivalent to organizing the data in a sequential increasing order along the columns. That is, despite it is not known where a specific data value D is located, it must be known that $D_1<D_2<D_3$ etc. This means that the entries are stored at nodes of a perfectly balanced binary tree sorted according to an increasing order of values from the left to the right in the tree (and thus also within the subtree as is indicated with the values $D_1$, $D_2$, $D_3$ in FIG. 1a, 1b).

Of course the storage of the individual data values in an increasing order from the left to the right in the binary tree (in an increasing order in the column direction in the memory) has an influence on the search algorithm that is used in each subtree. As was explained before, the main objective is to have as little row changes as possible, i.e. to change the most significant part of the address S=<A, B> as infrequently as possible since only the columnwise direction search is very fast. The storing of the data values in an increasing order in the column-direction leads to the result that the last entries in the columnwise direction must constitute the leaf nodes LN of each subtree. How many leaf nodes LN (leaf node storage positions LN in FIG. 1b) are assigned depends on the number of levels within the subtree, i.e. depends on the size of the memory in the column direction. For example a subtree having the level K=3 comprises four leaf nodes LN at the four most right-hand positions in the column direction (see the example in FIG. 3a, 3b).

First Embodiment (Search Strategy)

As outlined above, the present invention provides a mapping of the binary tree into the two dimensional memory space such that each row corresponds to a subtree and a specific search strategy is used within each row or subtree. The search is stopped within each subtree if either the match between the read out value and the data value to be searched is found or if a leaf node LF is found. Therefore, whilst performing the search within each subtree the search algorithm must keep track of the level where it is, since a changing of the row address will only be performed when a leaf node is arrived at. In the present invention it was found that not only can the search addresses be calculated within each subtree, but it was also found that a specific new root node address of a next subtree can be calculated only from the comparison result and the current address of a leaf node. That is, according to the invention a new complete address S=<A, B> specifying the storage address of a node where a next data value should be read out is calculated from the present address of the presently read out memory location and on the basis of the comparison result. This applies to the address of a next node within a subtree and is also valid for finding the storage address of the next root node of the next subtree to be search through.

Figure 1B:
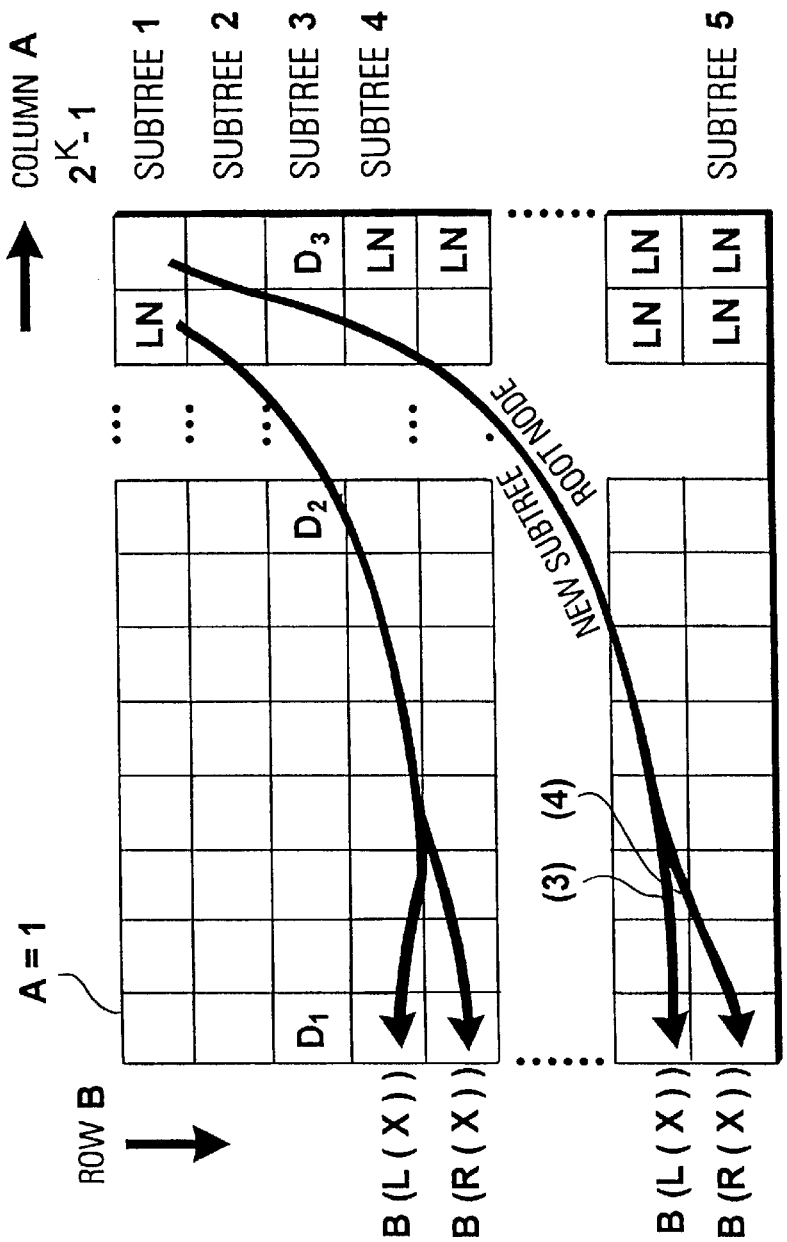
Figure 2:
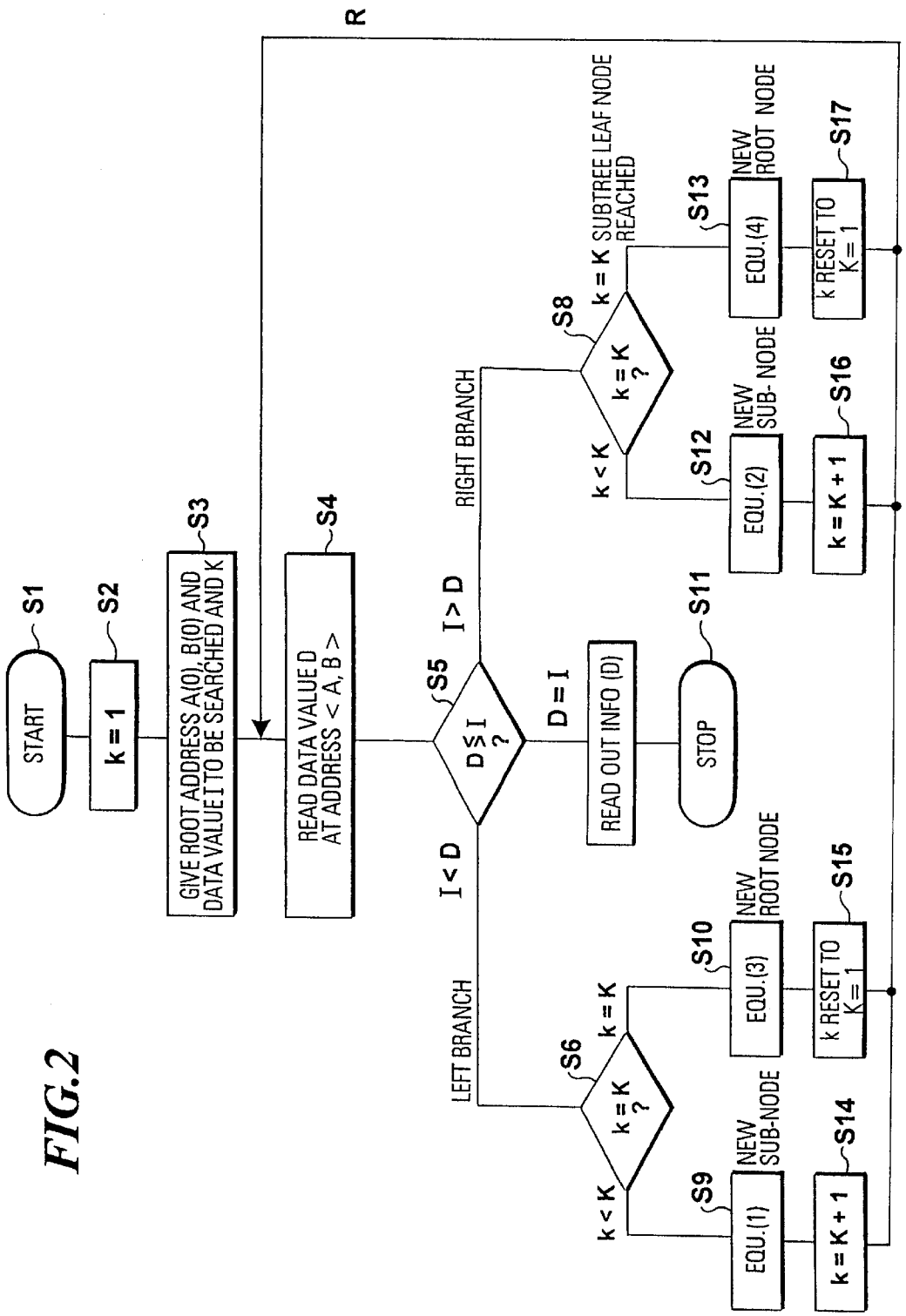
FIG. 2 is a flowchart illustrating the search method according to the invention.

FIG. 2 shows a flow chart according to an embodiment of the search method according to the invention. It should be noted, that for this algorithm the complete binary tree is divided into subtrees according to FIG. 1b and the left most subtree on the level below the root subtree is cut off.

As explained, the number of levels in a subtree equals the number of bits in the column address of the actual DRAM hardware. Therefore, after starting the search method in step S1, the level of the first subtree 1 is set to k=1, i.e. the search is started at the root node RN of the subtree 1 (see FIG. 1a). Then, in step S3, the data value I to be searched, the number of levels per subtree K as well as the location or root address. A(0), B(0) of the root node RN must is input. Therefore, the root node RN of the first subtree 1 is the entry point of the search algorithm.

In step S4 the data value D at the present address <A(0), B(0)> is read from the root node RN of the subtree 1. In step S5 the read out data value D is compared with the data value I to be located. If a match D=I is established in step S5, then an information associated with the found data value D is read out in step S7 whereafter the search comes to an end in step S11.

If in step S5 the read out data value D is greater than the data value I to be searched, step S6 determines whether a leaf node LN is reached or not. This can be decided by comparing the running number k with the given number of levels K. If in step S6, it is established that k<K steps S9, S14 are executed. In step S9 the following equation is used for calculating a new address of a node within the subtree 1 lying along the left branch (I<D):

$$B(L(X))=B(X)$$
$$A(L(X))=2*A(X)+0 \quad (1)$$

Here, B(L(X)) and A(L(X)) denote the new row address and column address of the next sub-node within the subtree 1. Thereafter, the running number of the depth level k is increased in step S14.

Likewise, if in step S5 it is decided that I<D a right branch from the root node RN is taken and if in step S8 it is determined that the full depth of the subtree has not been reached, i.e. k<K, steps S12, S16 are carried out analogously to steps S9, S14, wherein the equation (2) defines the storage address of the next entry or sub-node within subtree 1 as follows:

$$B(R(X))=B(X)$$
$$A(R(X))=2*A(X)+1 \quad (2)$$

As can be seen from step S5, steps S6, S8 and steps S9, S12, within the subtree only the column address part A is modified, i.e. it is either doubled for the left branch or doubled and moved one further column to the right for the right branch. It is important to note that the row address part B stays the same independently of the decision in step S5. Of course, the definitions given in equation (1), (2) are the direct result of the sequential increasing order of data values along the column direction. If. the read out data value is greater, than there is a jump of twice the column address and if the read out data value is smaller than the one to be searched I then it is twice the current column address plus one.

Of course, since steps S9, S12 are only carried out for k<K (K=maximum depth or number of levels within one subtree; K being predefined), a new data value D is read out in step S4 at the new address A, B as determined in steps S9, S12. The reference numeral R indicates this recursive running through the individual steps S4, S5, S6, S9, S14 and S4, S5, S8, S12, S16, respectively. During the recursive process, if within a subtree the data value is found (I=D) and the algorithm comes to an end in step S11.

However, after k iterations, step S6 or step S8 determine that the full depth of the allocated subtree is reached, i.e. k=K, which means that a leaf node storage position LN must have been reached. Using the columnwise increasing order of the data values, i.e. in each row the data values increase in the column direction, wherein always the data value at column position 1 in the next row is larger than the data value at the highest column position $2^K$ in the next smaller row, it is clear that the leaf nodes LN must correspond in the address space of the memory device in FIG. 1b to the last memory positions at the right end of the column address A.

If such a leaf node LN in the subtree 1 is reached, then the following equations (3), (4) are employed in step S10, S13 to respectively calculate a new row address and column address of a root node of a further subtree:

$$B(L(X))=2^K*B(X)+2*A(X)+0-2^K$$

$$A(L(X))=1 \quad (3)$$

$$B(R(X))=2^K*B(X)+2*A(X)+1-2^K$$

$$A(R(X))=1 \quad (4)$$

It is seen from equations (3), (4) that in case of the occurrence of a leaf node the column address A is—independently from the decision in step S5—set to the first column, i.e. A(L(X))=A(R(X))=1. Dependent on the decision in step S5, however, a new row address B is selected.

It is interesting to note from FIG. 1b where the arrows from the leaf node LN indicate the calculation according to equations (3), (4), that indeed the next root node of the next subtree is located in column A=1, however, it is not located on the next adjacent subtree 2 as one might have expected. By contrast, equations (3), (4) perform a kind of column-row-mapping where the new address of the next root node of the next subtree to be searched corresponds to the leaf node address transposed for equation (4) and to the transposed address −1 for equation (3).

Having determined the next root node of the next subtree to be searched in step S13, k is reset to k=1 in step S17, since obviously the search in the next subtree starts at level 1, i.e. at the root node address. Then again in step S4 the next data value D is read out and steps S5, S6, S9, S14 or steps S5, S8, S12, S16 are carried out recursively until either a match between D and I is found or again the leaf node of the new subtree is found.

Of course, it may happen that even within the subtree 4 or the subtree 5 in FIG. 1b the data value is not found and consequently a leaf node LN is arrived at. For example, if leaf node LN is arrived at in subtree 5, then neither equation (3) nor equation (4) can result in an address still contained with the address space if the number of rows and columns is the same. If the number of rows is larger than the number of the columns, then of course a further new calculation of a new subtree can be performed. However, the question remains what happens for example if no further subtree root node can be determined when the leaf node is reached in subtree 4. Firstly, this indicates that the data value was not found in the binary search through the subtree 4 and secondly the data value I to be searched must be obviously larger or smaller than all data values D stored in row and column addresses below the storage address of LN. In this case, the algorithm traces back the storage address of the leaf node LN in subtree 1 from which the root node address of subtree 4 was calculated (indicated with the dashed lines in FIG. 1b). Then the next leaf node LN to the right in the subtree 1 is used as a basis for calculation of a new subtree root node. That is, the column address A is stepped up one column A+1 whilst B is kept constant. Of course, this leads to the calculation of new root nodes for example for the subtree 5.

It should be noted that there is no real need that after returning to the leaf node LN (via the recalculation of the leaf node address as indicated with the dashed line) to go to a leaf node to the left (if there is one) since a returning to a leaf node address in the subtree 1 automatically means that all read out data values D were smaller than the data value I to be searched for. Therefore, in the column direction (horizontal direction of the subtree) all leaf nodes are now in an increasing order used for determining root nodes of new subtrees. If the last leaf node LN of e.g. subtree 5 is reached, then the data value I is not contained in the memory device in the specified address space.

It should be noted that preferably in step S5 a certain tolerance is admitted such that a match of D and I is established within a certain tolerance value, i.e. a match is found if $|D-I|<\Delta D$ wherein $\Delta D$ denotes a certain tolerance which is prespecified.

Example for K=3

Figure 3B:
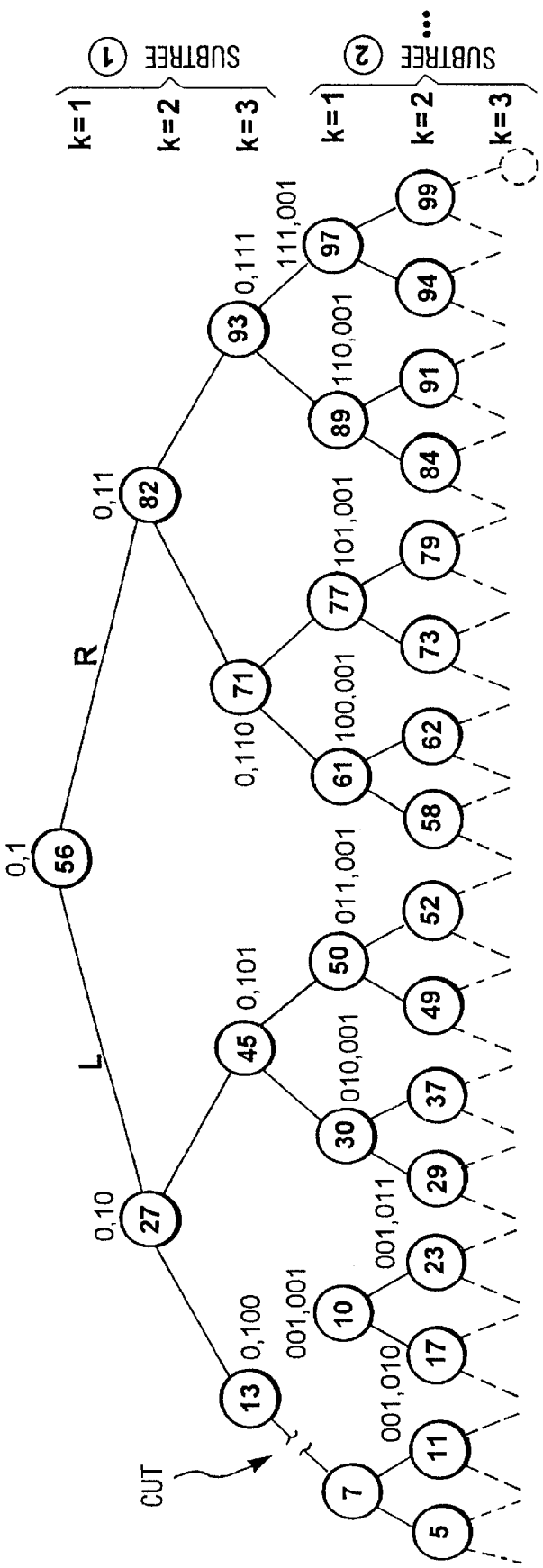

FIGS. 3a, 3b illustrate the general algorithm in FIG. 1a, 1b, 2 for a specific example where a binary notation is used for the column address A and the row address B. K=3 means that 8 columns and 8 rows are in principle provided in the memory address space. Since equations (1), (2) give no change in the column address if the very first root node RN at the top of the binary tree has an address A(0), B(0)=(000, 000) the first column address A=000 is not used. Therefore, the first node to be. looked up when step S4 in FIG. 2 is carried out for the first time will always be the top left memory location in the memory in FIG. 3a, i.e. B(0)=0|A(0)=1 for the top and first root node of the first subtree.

Using the binary representation for the address numbers of the row and column, FIG. 3b shows the subtree 1 and the subtree 2 which is located in the first two rows with addresses 000,001. A multiplication with two for a left branch L simply means a shifting of the column address part A to the left. A right branch R results in the column address part A being shifted to the left and added by "1". Thus, the individual addresses and the intermediate nodes at k=2 and at the leaf nodes at k=3 correspond to the particular row and column where a particular data value D is located. FIG. 3b shows the data values D=3,5,6,7 . . . at the respective intermediate nodes and leaf nodes.

Obviously, the algorithm in FIG. 2 calculates a new root node address of a next subtree whenever it reaches one of the four nodes 0,100 or 0,101 or 0,110 or 0,111. There is only one branch for the calculation of a new root node which is not allowed, which is for the address 0,100 in a situation where the read out data value D=7 is larger than the data value to be searched I. In this case actually a left branch from the address 0,100 should be taken, i.e. equation (3) should be employed. However, in this case equation (3) for a left branch would yield $B(L(X))=2^K(000)+2(100)-2^K=0000+1000-1000=0000$. Therefore, the first left branch indicted with "cut" in FIG. 1a or the dashed line between 000,100 and 000,001 must not be taken since the search would start from the root node address again.

However, when taking a right branch, B(R(X))=001, which means that the left most leaf node LN with the address 0,100 results in a next leaf node root address of 001, 001. As is indicated in FIG. 3b this corresponds actually to the root node of the subtree 2 located in the second row. As is seen from FIG. 3a, each of the leaf nodes of the subtree 1 can be "mapped" or "transferred" to new root nodes of new subtrees located at position A=1 at a specific row address. If the number of rows is at least the same size as the size of the column, it can be ensured that each leaf node LN of the subtree 1 can be "imaged" or "transposed" into a new root node address in the first column.

As is also seen in FIG. 3a, 3b, if there is a sequentially increasing order of data values in the column direction, the search algorithm described by equations (1)–(4) makes sure that a minimum number of row address changes is employed, whilst still the complete memory matrix is searched for finding a match (within a tolerance) with the data value to be searched I.

Using preferably a binary representation of the column address part A and the row address part B, the search can be facilitated, since a multiplication by 2 only means the shifting of the address to the left in a shift register.

In fact, as can already be seen from FIG. 3a but also from the general equations (3), (4), the new row address B (for a left branch from A) just means the inversion of the column address part A of the leaf node, i.e. $B(L(X))=010=\overline{101}$. Likewise, for the right branch from a leaf node, the new row address part of the new root node is the inversion of the leaf node column address +1, i.e. $B(R(X))=\overline{101}+1=011$. This of course assumes intrinsically that the first root node RN at the top of the binary tree is assigned $B(0)=0, A(0)=1$.

Hereinafter, a hardware realization of an embodiment of the access means according to the invention using such a search method as explained in FIGS. 1–3 will be explained with reference to the FIG. 4

Second Embodiment (Hardware implementation)

Figure 4:
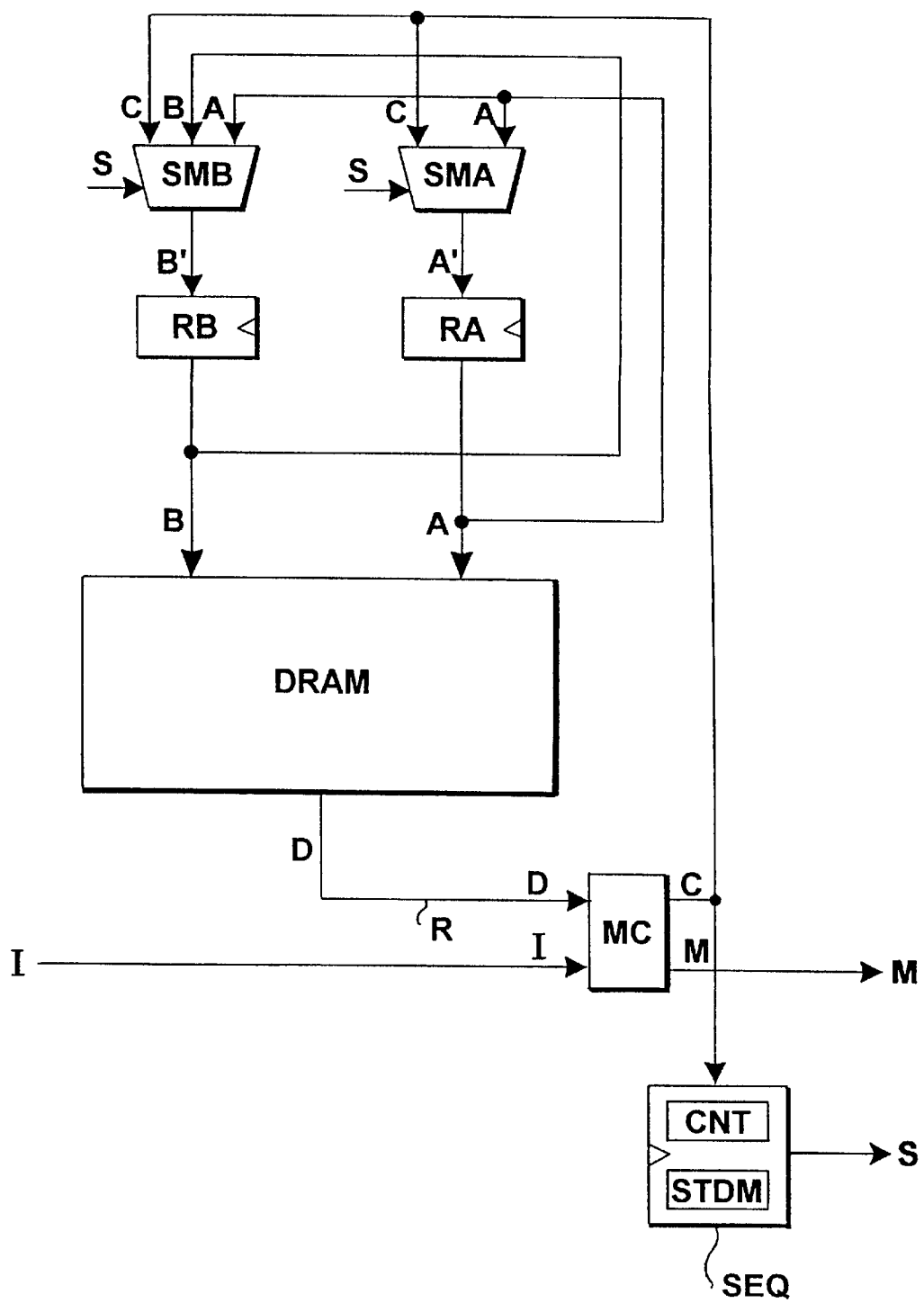
FIG. 4 shows an embodiment of the access means according to the invention for accessing data values stored in a DRAM memory.
Figure 6:
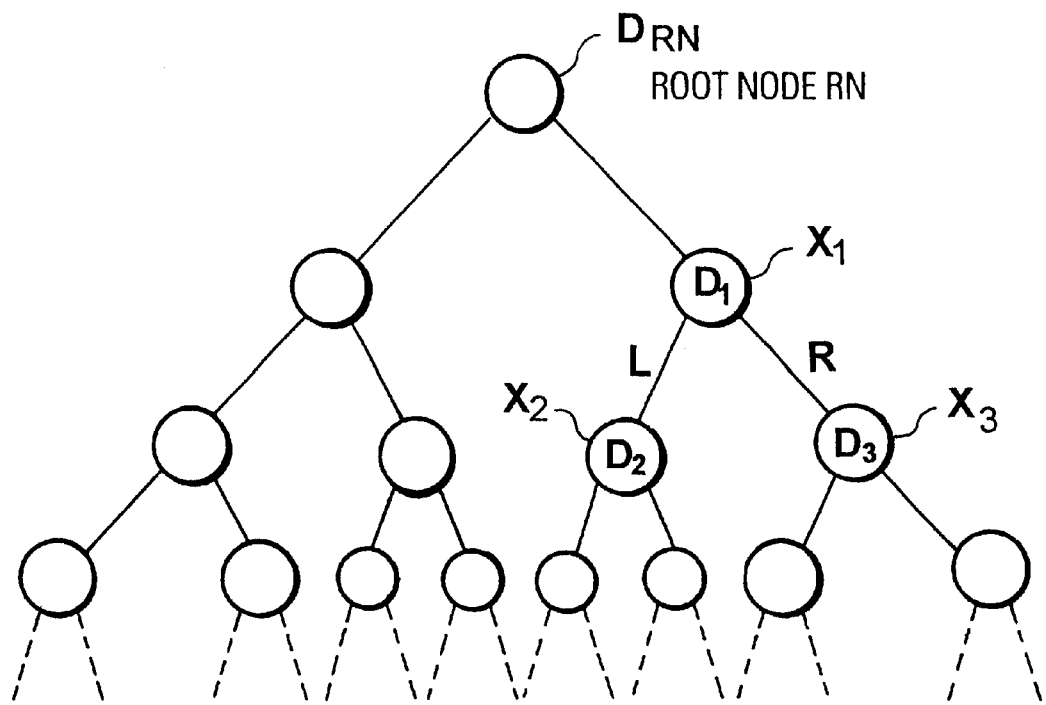
FIG. 6 shows a conventional logical binary tree structure used for performing a binary tree search according to the prior art.

In FIG. 4 DRAM denotes the memory device and the access means comprises a comparison means MC for comparing a read out data value D with said data value I to be searched to determine whether said read out data value D is greater or smaller than said data value I to be searched. If a match between D and E is found by the comparison means, a match signal M is output. The comparison result C indicates whether the value D is larger or smaller than the value I. A reading out means R (not shown in detail) reads out a data value at a predetermined current search address A, B input from two registers RA, RB which hold the intermediate row and column addresses during the traverse of the tree.

The access means further comprises a determining means SEQ, SMB, SMA including the registers RB, RA for determining a complete search address to be searched next for the data value on the basis of the comparison result C and said current search address A, B.

The determining means comprises said first and second registers and a first and second calculation circuit SMB, SMA for computing the next column and row addresses A', B' to be searched depending on the comparison result C, the current address B, A and a control signal S output by a state machine SEQ.

The state machine SEQ determines the search state (in fact it monitors K and thus intrinsically carries out steps S6, S8 in FIG. 2) during the searching through the binary tree data structure and determines the control signal S on the basis of the comparison result. Essentially, the state machine SEQ comprises a counter and a state determining means STDM to generate the control signal S on the basis of the internal $STATE_t$. Essentially, the internal state of the state machine corresponds to the current level number k which is updated whenever a new comparison result C (indicating whether D<I or not) is output by the comparison means MC. That is, the state is 0 for the root node of a subtree, 1 to K−1 for non leaf nodes (except the root node) and K for leaf nodes. Similarly the control signal S is 0 for the root node, 1 for non leaf nodes (sub-nodes) and 2 for leaf nodes. Starting from the root node with a state 0 the state machine SEQ will advance according to the partitioning of the subtree when traversing the tree top down. The signal S will select the type of address computation in SMB and SMA in accordance with the mapping.

Specifically, the individual items of the access means perform the following functions. The first calculation circuit SMB performs the following function (given in functional notation) where K is the number of levels in a subtree:

$B'=0$, if $S=0$;

$B'=B$, if $S=1$;

$B'=2^K*B+2*A+C-2^K$, if $S=2$; (6)

wherein C (0 for D>I and 1 for D<I) denotes the comparison result, B and B' denote the current and the next column address, S denotes the control signal, K denotes said predetermined number of levels in a subtree and A denotes the current row address.

The second calculation circuit SMA performs the following functions (given in functional notation):

$A'=1$, if $S=0$;

$A'=2*A+C$, if $S=1$;

$A'=1$, if $S=2$, (7)

wherein C denotes the comparison result and A and A' denote the current and the next row address and S denotes the control signal.

The state machine SEQ calculates the control signal S on the basis of the following equations (8) and (9):

$S=0$, if $STATE_t=0$;

$S=1$, if $STATE_t=k$;

$S=2$, if $0<STATE_t<k$, (8)

wherein a state determining means (STDM) of said state machine (SEQ) calculates an internal state $STATE_k$ (i.e. the value K in FIG. 2) of the state machine (SEQ) according to the following equation (9):

| | | |
|---|---|---|
| $STATE_t = 0$, | if t = 0; | (9) |
| $STATE_{t+1} = 2$, | if $STATE_t = 0$; | |
| $STATE_{t+i} = 1$, | if $STATE_t = k$; | |
| $STATE_{t+i} = STATE_t + 1$, | if $0 < STATE_t < K$ | | wherein $STATE_t$ and $STATE_{t+1}$ denotes the state at times t and t+1, and t denotes the number of comparisons counted from the comparison result, wherein $0<t<K$ and wherein $STATE_{t=0}$ denotes the state when the first comparison is performed at a memory location corresponding to the root node RN of the binary tree data structure.

As was already observed with the dashed lines in FIG. 1b, 3a, also the access means in FIG. 4 respectively stores the leaf node address from which the root node subtree address was calculated. If the next subtree search does not result in a match, i.e. the leaf nodes of the next subtree are reached (and a recalculation of a new subtree node would result in a row address B exceeding the row address space of the memory DRAM), then the next higher or lower leaf node address of the previous subtree is taken as a basis for calculating a new subtree root node. Therefore, also the access means shown in FIG. 4 can perform a complete search of the complete memory.

In FIG. 4 a leaf node monitor LN-MON stores the last address of the leaf node from which the next subtree was calculated. That is, if S=2 (indicating that a complete search of a subtree has been made) a new root node is calculated from the current column address A and row address B according to equations (3), (4). If after the next iteration through a subtree again a leaf node LN is found and a renewed calculation of a new root node from this leaf node address results in a row address which is not contained in the memory address space of the memory, then the leaf node monitor LN-MON inputs the last leaf node address from the previously subtree and subtracts/adds the value 1 from/to the column address part A. If a root node address calculated on the basis of the "left" (−1) leaf node address does not result in the data item to be found, then in the next step the leaf node to the right of the old leaf node (+1) is taken as a basis for calculating the next root node address. If all subtrees having root node addresses respectively being based on a leaf node address of a previously subtree do not result in the data value being located in the memory, then it can definitely be concluded that the data value I is not present in the memory.

As explained, in these circumstances, it seems sufficient that only the next leaf node to the left and to the right of the presently considered leaf node is taken as a basis for calculating the next root node address. For example in FIG. 3a if the two root nodes 100,001 and 101,001 being based on the previous subtree leaf node address 000,110 both do not result in a match when searching through their associated subtrees, it seems sufficient that only the left lower leaf node 000,101 and the next higher leaf node 000,111 is taken as a basis for calculating a new root node address of a next subtree. There is no reason to go back to the leaf node address 000,100 since invariably when arriving at the leaf node 000,101 in the subtree 1 it has been established that the data value I to be located is greater than the data value D=7 located at the leaf node address 000,100. Therefore, using the 3 leaf nodes in succession will result in the complete memory array being searched for the data value I.

Industrial Applicability

As outlined above, the method and the access means according to the invention only use a minimum number of steps before a change in a subtree is caused. As follows from the mapping, only the column address changes during a traverse inside the subtree. When dynamic random access memories have to be used, due to the amount of the data, the invention can provide a fast search engine for a data value sorted according to a binary tree data structure. The reduction in time is an order of magnitude. Thus, the invention can be used in all technical areas where the time is critical for locating a data value in a large memory. The only limitation is that the data values are stored in an increasing order in the columnwise direction.

It should be noted that in the above description the row can be exchanged by the column since it will depend on the organization of the memory which storage direction is denoted row and column, respectively.

As explained above, according to the invention the fast search through the memory can be achieved without pointers, wherein the complete storage address consisting of a row part and a column part can be respectively determined from the previous comparison result and from the previous storage address.

What is claimed is:

1. A method for determining the storage address (A(X), B(X)) of a predetermined data value (D), in a memory device (DRAM), the data values (D) being stored at predetermined storage addresses (A(X), B(X)) according to a binary tree data structure of nodes, branches, subtrees and leafs, comprising the following steps:
   a) reading out a data value (D) at a predetermined current search address (A(X), B(X)) from the memory device;
   b) comparing said read out data value (D) with the data value (I) to be searched to determine whether said read out data value (D) is greater or smaller than said data value (I) to be searched; and
   c) determining a complete next search address (A', B') to be searched for the data value on the basis of the comparison result (C) and said current address (A(X), B(X)); wherein
   d) said steps a)–c) are recursively carried out until said read out data value (D) matches said data value (I) to be searched within a predetermined tolerance (ΔD).

2. A method according to claim 1, wherein
the data values are stored in a binary tree data structure having a predetermined number of levels (K), wherein in said step c) said next address is determined on the basis of said comparison result (C), said current search address and also said predetermined number (K) of levels, after having performed a number of comparisons in said step b) equal to said predetermined number (K) of levels.

3. A method according to claim 1, wherein
the data values (D) are in a range of a lowest data value and a highest data value, wherein a center data value corresponding to the center value of said range is stored at a predetermined root address (A(0), B(0); "root"), wherein, when step a) is carried out for the first time, said root address is used as said current address.

4. A method according to claim 1, wherein
said data values are stored in said memory device in a matrix arrangement of rows and columns, wherein each data value (D) is assigned a row address (A) and a column address (B).

5. A method according to claim 1, wherein
said data values are stored in said memory device in a matrix arrangement of rows and columns, wherein each data value (D) is assigned a row address (A) and a column address (B); and
when said comparison result (C) in step b) indicates that the read out data value is smaller than said data value to be searched ("branch left"), said next address in step c) is calculated by the following equation (1):

$$B(L(X))=B(X)$$
$$A(L(X))=2*A(X)+0 \qquad (1)$$

where X denotes the current memory location defined by the current address (A(X), B(X)), A(X) and B(X) denote the column address and the row address of the current memory location X, L(X) denotes the next memory location where a data value is stored which is smaller than the data value stored at the current memory location X, and A(L(X)) and B(L(X)) denote the column address and row address of the next memory location L(X).

6. A method according to claim 5, wherein
said data value stored at said next address is half the data value stored at the current address.

7. A method according to claim 1, wherein said data values are stored in said memory device in a matrix arrangement of rows and columns, wherein each data value (D) is assigned a row address (A) and a column address (B); and when said comparison result in step b) indicates that the read out data value is greater than said data value to be searched ("branch right"), said next address in step c) is calculated by the following equation (2):

$$B(R(X))=B(X)$$
$$A(R(X))=2*A(X)+1 \qquad (2)$$

where X denotes the current memory location defined by the current address (A(X), B(X)), A(X) and B(X) denote the column address and the row address of the current memory location X, R(X) denotes the next memory location where a data value is stored which is greater than the data value stored at the current memory location X, and A(R(X)) and B(R(X)) denote the column address and row address of the next memory location R(X).

8. A method according to claim 7, wherein said data value stored at said next address is 1.5 times the data value stored at the current address.

9. A method according to claim 1, wherein the data values are stored in a binary tree data structure having a predetermined number of levels (K), wherein in said step c) said next address is determined on the basis of said comparison result (C), said current search address and also said predetermined number (K) of levels, after having performed a number of comparisons in said step b) equal to said predetermined number (K) of levels;

said data values are stored in said memory device in a matrix arrangement of rows and columns, wherein each data value (D) is assigned a row address (A) and a column address (B); and when said comparison result in step b) indicates that said read out data value is smaller than said data value to be searched ("leaf left"), said next address in step c) is calculated by the following equation (3):

$$B(L(X))=2^{K}*B(X)+2*A(X)+0-2^{K}$$
$$A(L(X))=1 \qquad (3)$$

where X denotes the current memory location defined by the current address (A(X), B(X)), A(X) and B(X) denote the column address and the row address of the current memory location X, L(X) denotes the next memory location where a data value is stored which is smaller than the data value stored at the current memory location X, and A(L(X)) and B(L(X) denote the column address and row address of the next memory location L(X) and $2^K$ is the number of columns in the memory device.

10. A method according to claim 9, wherein said data value stored at said next address is half the data value stored at the current address.

11. A method according to claim 1, wherein the data values are stored in a binary tree data structure having a predetermined number of levels (K), wherein in said step c) said next address is determined on the basis of said comparison result (C), said current search address and also said predetermined number (K) of levels, after having performed a number of comparisons in said step b) equal to said predetermined number (K) of levels;

said data values are stored in said memory device in a matrix arrangement of rows and columns, wherein each data value (D) is assigned a row address (A) and a column address (B); and when said comparison result in step b) indicates that the read out data value is greater than said data value to be searched ("leaf right"), said next address in step c) is calculated by the following equation (4):

$$B(R(X))=2^{K}*B(X)+2*A(X)+1-2^{K}$$
$$A(R(X))=1 \qquad (4)$$

where X denotes the current memory location defined by the current address (A(X), B(X)), A(X) and B(X) denote the column address and the row address of the current memory location X, R(X) denotes the next memory location where a data value is stored which is greater than the data value stored at the current memory location X, and A(R(X)) and B(R(X)) denote the column address and row address of the next memory location R(X) and $2^K$ is the number of columns in the memory device.

12. A method according to claim 11, wherein said data value stored at said next address is 1.5 times the data value stored at the current address.

13. A method according to claim 1, wherein after said step d) information stored in association with said matching data value is read out from the memory location having said current address.

14. A method according to claim 1, wherein the memory device is one of a DRAM or a cache memory.

15. An accedes means for a memory device for determining the storage address (A(X), B(X)) of a predetermined data value (D) in a memory device (DRAM), the data values (D) being stored at predetermined storage addresses (A(X), B(X)) according to a binary tree data structure of nodes, branches, subtrees and leafs, comprising:

a) a reading out means (R) for reading out a data value at a predetermined current search address (A(X), B(X)) of said memory device;

b) a comparison means (MC) for comparing said read out data value (D) with said data value (I) to be searched to determine whether said read out data value (D) is greater or smaller than said data value (I) to be searched; and c) determining means (SEQ, SMB, SMA, RB, RA) for determining a complete next search address (A, B) to be searched for the data value on the basis of the comparison result (C) and said current search address (A(X), B(X)); wherein d) said reading out means, said comparison means and said determining means carry out recursively said reading out, said comparing and said determining until said read out data value (D) matches (M) said data value (I) to be searched within a predetermined tolerance.

16. An access means according to claim 15, wherein the data values are stored in the memory device (DRAM) in a matrix arrangement of rows and columns, wherein each data value (D) is assigned a row address (A) and a column address (B).

17. An access means according to claim 16, wherein the data values in the memory device are stored in a binary tree data structure having a predetermined number of levels (K), wherein said state machine (SEQ) comprises a counter (CNT) which counts the number of comparisons (C) performed by said comparison means (MC).

18. An access means according to claim 16, wherein said determining means comprises:
   a first and second register (RB; RA) for holding a next column and row address (B', A');
   a first and second calculation circuit (SMB, SMA) for computing the next column and row addresses (A', B') to be searched depending on the comparison result (C), the current address (B, A) and a control signal (S); and
   a state machine (SEQ) for determining a search state ($STATE_t$) during the searching through the binary tree data structure and for determining said control signal (S) on the basis of the comparison result (C).

19. An access means according to claim 18, wherein said state machine (SEQ) calculates said control signal (S) on the basis of the following equations (8):

$S=0$, if $STATE_t=0$;

$S=1$, if $0<STATE_t<k$;

$S=2$, if $STATE_t=K$, wherein a state determining means (STDM) of said state machine (SEQ) calculates an internal state $STATE_t$ of said state machine (SEQ) according to the following equation (9):

| | | |
|---|---|---|
| $STATE_t = 0$, | if t = 0; | (9) |
| $STATE_{t+1} = 2$, | if $STATE_t = 0$; | |
| $STATE_{t+i} = 1$, | if $STATE_t = k$; | |
| $STATE_{t+i} = STATE_t + 1$, | if $0 < STATE_t < K$ | | wherein $STATE_t$ and $STATE_{t+1}$ denotes the state at times t and t+1, and t denotes the number of comparisons counted by the counter (CNT), wherein $0<t<K$ and wherein $STATE_{t=0}$ denotes the state when the first comparison is performed at a memory location corresponding to the root node of said binary tree data structure.

20. An access means according to claim 18, wherein said comparison result (C) is calculated by said comparison means (MC) according to the following equation (5):

$C=0$, if $I<D$;

$C=1$, if $I \geq D$;  (5)

wherein C denotes the comparison result, I denotes the data value to be searched and D denotes the read out data value.

21. An access means according to claim 20, wherein said first calculation circuit (SMB) calculates the next column address (B') according to the following equation (6):

$B'=0$, if $S=0$;

$B'=B$, if $S=1$;

$B'=2^K*B+2*A+C-2^K$, if $S=2$;  (6)

wherein C denotes said comparison result, B and B' denote the current and the next column address, S denotes the control signal, K denotes said predetermined number of levels (K) in the binary tree data structure, and A denotes the current row address.

22. An access means according to claim 20, wherein said second calculation circuit (SMA) calculates the next row address (A') according to the following equation (7):

$A'=1$, if $S=0$;

$A'=2*A+C$, if $S=1$;

$A'=1$, if $S=2$,  (7)

wherein C denotes the comparison result, A and A' denote the current and the next row address and S denotes the control signal.

23. An access means according to claim 15, wherein said reading out means (R) reads out information stored in said memory means (DRAM) in association with said matching data value.

24. An access means according to claim 15, wherein said memory device is one of a DRAM or a cache memory.

25. A method for determining the row/column addresses (B(X), A(X)) of a given data value (I) in a memory device (DRAM), in the memory positions of which data values (D) are stored in accordance with a binary tree data structure of nodes (X), branches, subtrees and leaves comprising a predetermined number K of planes in each subtree, in which
   the nodes (X) and leaves (LN) correspond to the memory position;
   each branch constitutes a relation of a memory position to another memory position in which the next smaller or next larger data value is stored; and
   the memory positions of a respective row correspond to the nodes of a subtree;
   in which the data values (D) are in a range between a lowest data value and a highest data value and a middle data value which corresponds to the mid value of the range, and is stored at a predetermined root-row/column address (B(0), A(0)), which corresponds to a root node of the binary tree data structure;
   comprising of the following steps:
      a) reading out a data value (D) at a present row/column address (B(X), A(X)) from the memory device, in which, when step a) has been carried out for the first time, the root-row/column address is used as the present address;
      b) comparing the read out data value (D) with the data value (I) to be sought, to determine whether the read out data value (D) is greater or smaller than the data value (I) to be sought;
      c) determining a complete next row/column address (B(L(X)), B(RRX)); A(L(X)), which is to be sought in accordance with the data value on the basis of the comparison result (C) of the present row/column address (B(X), A(X)), the predetermined number of planes K in each subtree and the number of comparisons carried out in step b); in which
      d) the steps a) to c) are carried out recursively, until the read out data value (D) is identical with the data value (I) to be sought within a predetermined tolerance (D); in which
         c1) when the comparison result (C) shows in step b) that the read out data value is greater ("lefthand branch") or smaller ("righthand branch") than the data value (I) to be sought and the number of comparisons, which were carried out in step b), is not equal to a multiple of the number K of planes in a subtree, the next column row address is computed in step c) by the following equation (1) or by equation (2):

$$B(L(X))=B(X)$$

$$A(L(X))=2*A(X)+0 \qquad (1)$$

$$B(R(X))=B(X)$$

$$A(R(X))=2*A(X)+1 \qquad (2)$$

c2) when the comparison result shows in step b) that the read out data value is greater ("end point left") or smaller ("end point right") than the data value (I) to be sought and the number of comparisons which were carried out in step b) is equal to a multiple of the number K of planes in a subtree, the next column/row address in step c) is computed by the following equation (3) and/or the equation (4):

$$B(L(X))=2^K*B(X)+2*A(X)+0-2^K$$

$$A(L(X))=1 \qquad (3)$$

$$B(R(X))=2^K*B(X)+2*A(X)+1-2^K$$

$$A(R(X))=1 \qquad (4)$$

wherein X designates the present node, which is defined by the present row/column address (B(X), A(X), B(X) and A(X) are the column/row address of the present node X, L(X) or R(X) are the next nodes, on which a data value is stored, which is smaller than or larger than the data value stored on the present node X, B(L(X)) and A(L(X))or B(R (X)) and A(R(X) are the column/row addresses of the next node, and $2^K$ is the number of columns in the memory device.

26. A method in accordance with claim 25, wherein after step d) information which is stored in connection with the identical data value is read out from the memory position with the present address.

27. A method in accordance with claim 25, wherein the memory device is a DRAM or a cache memory.

28. An access means for a memory device for carrying out the method in accordance with claim 25, comprising:
a) a read out device (R) to read out a data value at the preset present column/row address B(X), A(X) of the memory device;
b) a comparative device (MC) to compare the read out data value (D) with the data value (I) to be sought, to find a comparison result, which shows whether the read out data value (D) is larger or smaller than the data value (I) to be sought; and
c) a determination device (SEQ, SMB, SMA, RB, RA) to determine the complete next row/column address (A, B), which is to be sought in accordance with the data value, in which
c1) the determination device comprises:
a first and second register (RB; RA) to hold the next row/column address (B', A');
a first and second computation circuit (SMB, SMA) to compute the next column/row address (B', A') which is to be sought, depending on the comparison result (C), the present address (B, A) and a control signal (S); and
a state machine (SEQ) to determine a search state (STATE$_t$) during the search of the binary tree data structure and to determine the control signal on the basis of the comparison result (C), in which the state machine (SEQ) has a counter (CNT) which counts the number of comparisons carried out by the comparison device (MC);
b1) wherein the comparsion result (C) is computed by the comparison device (MC) as in the following equation (5):

$$C=0, \text{ if } I<D;$$

$$C=1, \text{ if } I \text{ is less than or equal to } D; \qquad (5)$$

wherein C is the comparison result, I is the data value to be sought and D is the read out data value;
c2) wherein the first computation circuit (SMB) computes the next row address (B') as in the following equation (6):

$$B'=0, \text{ if } S=0$$

$$B'=B, \text{ if } S=1$$

$$B'=2^K*B+2*A+C-2^K, \text{ when } S=2; \qquad (6)$$

wherein C is the comparison result, B and B' are the present and next line addresses, S is the control signal, K is the preset number of planes in a subtree (bits in the column address) and A is the present column address;
c3) wherein the second computation circuit (SMA) computes the next column address (A') as in equation (7) below:

$$A'=1 \text{ when } S=0$$

$$A'=2*A+C \text{ when } S=1;$$

$$A'=\text{when } S=2, \qquad (7)$$

wherein C is the comparison result, A and A' are the present and the next column address and S is the control signal; and
c4) in which the state machine (SEQ) computes the control signal (S) based on the equation (8) below:

$$S=0, \text{ when } STATE_t=0;$$

$$S=2, \text{ when } STATE_t=K;$$

$$S=1, \text{ when } 0<STATE_t<K; \qquad (8)$$

wherein a state determination device (STDM) of the state machine (SEQ) computes an internal state STATE$_t$ of the state machine (SEQ) as in the equation (9) below:

$$\begin{array}{lll} STATE_t = 0, & \text{if } t = 0; & (9) \\ STATE_{t+1} = 2, & \text{if } STATE_t = 0; \\ STATE_{t+i} = 1, & \text{if } STATE_t = K; \\ STATE_{t+i} = STATE_t + 1, & \text{if } 0 < STATE_t < K \end{array}$$

wherein $STATE_t$ and $STATE_{t+1}$ are the states at times t and t+1 and t is the number of comparisons counted by the counter (CNT), wherein $0<t<K*N$ and N is the number of subtree planes of the complete binary tree and where $STATE_t=0$ designates the state when the first comparison is carried out on the memory position corresponding to the root nodes of the binary tree data structure.

29. An access means in accordance with claim 28, wherein the read out device (R) reads out information which is stored in the memory device (DRAM) in connection with the identical data value.

30. An access means in accordance with claim 28, characterized in that the memory device is a DRAM or a cache memory.

31. An access means in accordance with claim 30, characterized in that the memory device has a row address part and a column address part and the column address part is used to select one entry of the sequential data entries within a specific cache line and the line address part is used to select a specific cache line.

\* \* \* \* \*